United States Patent [19]

Ang et al.

[11] Patent Number: 4,958,312

[45] Date of Patent: Sep. 18, 1990

[54] DIGITAL MULTIPLIER CIRCUIT AND A DIGITAL MULTIPLIER-ACCUMULATOR CIRCUIT WHICH PRELOADS AND ACCUMULATES SUBRESCULTS

[75] Inventors: Peng-Huat Ang, Los Altos; Charles C. Stearns, Palo Alto, both of Calif.

[73] Assignee: LSI Logic Corporation, Milpitas, Calif.

[21] Appl. No.: 118,496

[22] Filed: Nov. 9, 1987

[51] Int. Cl.$^5$ ............................................. G06F 7/48
[52] U.S. Cl. ................................... 364/754; 364/736
[58] Field of Search ............... 364/736, 738, 728, 754, 364/768, 788

[56] References Cited

U.S. PATENT DOCUMENTS 4,215,416 7/1980 Muramatsu .

OTHER PUBLICATIONS

Paper entitled "A Suggestion for a Fast Multiplier", by C. S. Wallace, *IEEE Transactions on Electronic Computers*, Feb., 1964, pp. 14–17.

Article entitled "A CMOS 32b Wallace Tree Multiplier-Accumulator", by Abbas El Gamal, et al., *IEEE International Solid State Circuits Conference*, Feb. 20, 1986, pp. 194–195, also p. 345.

Book entitled *Introduction to Arithmetic for Digital Systems Designers*, Schlomo Wasser, et al., 1982 CBS Publishing, 383 Madison Ave., New York, NY 10017, p. 15.

Paper entitled "A NMOS LSI 16X16 Multiplier", by Norman C. Wittmer et al., *IEEE International Solid-State Circuits Conference*, Feb. 23, 1983, pp. 32 and 33.

*Primary Examiner*—Eugene R. LaRoche
*Attorney, Agent, or Firm*—Skjerven, Morrill MacPherson, Franklin & Friel

[57] ABSTRACT

Disclosed is a digital multiplier-accumulator circuit utilizing a carry save adder tree, pipeline register and carry select adder. Also disclosed is a digital multiplier circuit including a carry save adder tree and a pipeline register.

9 Claims, 7 Drawing Sheets

| OE | PREL | ACTION |
|---|---|---|
| 1 | 1 | PRELOAD DATA TO PIPELINE REGISTER |
| 1 | 0 | CARRY SAVE ADDER DATA TO PIPELINE REGISTER |
| 0 | 1 | FEEDBACK DATA FROM PIPELINE REGISTER RETURNED TO PIPELINE REGISTER |
| 0 | 0 | DATA FROM CARRY SAVE ADDER TREE TO PIPELINE REGISTER |

| ACC. | ADD/SUBTRACT | ACTION |
|---|---|---|
| 0 | 0 | PASS ZERO |
| 0 | 1 | PASS ZERO |
| 1 | 1 | PASS DATA FROM PIPELINE REGISTER |
| 1 | 0 | PASS INVERTED PIPELINE REGISTER DATA |

DIGITAL MULTIPLIER CIRCUIT AND A DIGITAL MULTIPLIER-ACCUMULATOR CIRCUIT WHICH PRELOADS AND ACCUMULATES SUBRESCULTS

BACKGROUND OF THE INVENTION

1. Field of the Invention

This invention relates to digital multiplier and digital multiplier-accumulator circuits, and more particularly to digital multiplier and digital multiplier-accumulator circuits utilizing a pipeline register.

2. Description of the Prior Art

In certain applications it is necessary to accumulate the result of several products obtained by the multiplication of pairs of numerical quantities. Digital multiplier-accumulator circuits are known in the prior art and perform digital multiplication and product accumulation. Such multiplier-accumulators typically operate on a digital, and usually binary, multiplier quantity and a corresponding digital multiplicand quantity and generate a binary product. In addition to adding the results of products obtained from multiplication, a subtraction of one result from another may be obtained by adding a twos complement, or a ones complement, to a previous product in order to subtract. In addition to accumulating the sum of a series of operations (products), it may also be desirable to preload the circuit with external data prior to beginning calculations of new products. U.S. Pat. No. 4,215,416 issued July 29, 1980 to John J. Muramatsu for a "Integrated Multiplier-Accumulator Circuit With Preloadable Accumulator Register" is illustrative of a multiplier-accumulator which provides for preloading and the positive and negative accumulation of products. The circuit in the Muramatsu patent includes an accumulator register which may be loaded with preload data and also serves to accumulate the result of a series of products. In addition, the Muramatsu circuit utilizes an array multiplier to produce the product of the multiplier and multiplicand quantities. Also, the Muramatsu multiplier-accumulator produces quantities in which the product contains twice as many binary digits, or bits, as either the multiplier or the multiplicand, in those cases where the multiplier and multiplicand have an equal number of bits.

As noted above, the multiplier-accumulator circuit disclosed in the Muramatsu patent described above, utilizes an array multiplier to perform the multiplication function, however other types of digital multipliers exist. A second type of multiplier, generally referred to as a carry save adder tree, was proposed by C. S. Wallace and described in an article entitled "A Suggestion For A Fast Multiplier", which appeared in IEEE Transactions on Electronic Computers, February 1964. The type of carry save adder tree described in this article has become known as the wallace tree multiplier. Multiplication with a Wallace tree, or carry save adder tree, is implemented as the addition of a number of summands, each some simple multiple of the multiplicand, chosen from a limited set of available multiples on the basis of one or more multiplier digits. The increased speed is produced by the acceleration of the addition of summands. The carry save adder tree utilized to provide the multiplication function achieves a production of product more quickly than an array multiplier and accordingly is a viable source of a multiplier for a multiplier-accumulator circuit.

A multiplier-accumulator circuit utilizing a Wallace tree has been described in an article entitled "A CMOS 32b Wallace Tree Multiplier-Accumulator" by Abbas El Gamal, David Gluss, Peng-Huat Ang, Jonathan Greene and Justin Reyneri, which appeared in the *IEEE International Solid-State Conference Circuits*, Feb. 20, 1986. This multiplier-accumulator utilized a carry-save adder tree and a carry select adder to provide a fast accumulation of products, achieving speeds in excess of the prior art. However, the present invention utilizes additional features not found in this article and produces a multiplier-accumulator circuit more advantageous than any of those found in the prior art.

SUMMARY OF THE INVENTION

It is an object of the present invention to provide a digital multiplier circuit having an operating speed in excess of that achievable by the prior art.

It is another object of the present invention to provide a digital multiplier-accumulator circuit capable of operating at speeds faster than those achievable by prior art multiplier-accumulator circuits.

It is a further object of the present invention to provide a digital multiplier-accumulator circuit which in addition to operating at speeds faster than achievable by the prior arts also permits including with multiplier computations preload data from an external source.

In accordance with the present invention, a digital multiplier circuit is provided which comprises: a carry save adder tree circuit having a first input circuit for receiving digital data to be multiplied and an output circuit; a pipeline register having an input circuit and an output circuit; means connecting the output circuit of said carry save adder tree circuit to the input circuit of said pipeline register; a second adder circuit having an input circuit and an output circuit means connecting the output circuit of said pipeline register to the input circuit of said second adder circuit; data output terminals for providing output data from said second adder circuit; and means connecting the output circuit of said second adder to said data output terminals.

In accordance with the present invention, a digital multiplier-accumulator circuit is provided which comprises: first and second input registers, each having an input and an output; a carry save adder tree circuit having a first input circuit connected to the output of said first and second input registers, a second input circuit, and an output circuit; a pipeline register having an input circuit and an output circuit; first circuit means having a first input connected to the output circuit of said carry save adder tree and an output connected to the input circuit of said pipeline register; second circuit means connecting the output circuit of said pipeline register to the second input circuit of said carry save adder tree; a second adder circuit having an input circuit and an output circuit; means connecting the output circuit of said pipeline register to the input circuit of said second adder circuit; an accumulator register having an input circuit and an output circuit; means connecting the output circuit of said second adder circuit to the input circuit of said accumulator register; data output terminals for providing output data from said accumulator register; and means connecting the output circuit of said accumulator register to said data output terminals.

In accordance with another feature of the present invention, the second adder circuit comprises a carry select adder.

In accordance with yet another feature of the invention, the above multiplier-accumulator circuit includes means for preventing signals from the accumulator register output circuit from reaching the data output terminals and includes means for connecting the data output terminals to a second input of the first circuit means to permit data to be loaded into the pipeline register from the data output terminals.

In accordance with another feature of the invention, the carry save adder tree includes data encoding means. In accordance with yet another feature of the invention, the data encoding means utilizes a modified Booth encoding algorithm.

In accordance with yet another feature of the present invention, a digital multiplier-accumulator circuit is provided which comprises: first and second input registers, each having an input and an output; a carry save adder tree circuit having a first input circuit connected to the output of said first and second input registers, and having a second input circuit, and an output circuit; a pipeline register having an input and an output; means connecting the input of said pipeline register to the output circuit of said carry save adder tree; accumulator control logic means having an input connected to the output of said pipeline register, and having an output connected to said second input circuit of said carry save adder tree; a second adder circuit having an input connected to the output of said pipeline register, and having an output; an accumulator register having an input connected to the output of said second adder circuit, and having an output for providing output data.

As a further feature of the present invention, the second adder circuit in the immediately preceding multiplier-accumulator circuit comprises a carry select adder.

As a further feature of the present invention, the carry save adder tree of either of the two foregoing circuits includes data encoding means.

In accordance with a further feature of the present invention, modified Booth encoding is utilized in the multiplier-accumulator circuit as set forth in the foregoing featured inventions.

BRIEF DESCRIPTION OF THE DRAWINGS

Other objects and advantages of the invention will become apparent from a study of the specification and drawings in which:

FIGS. 6 and 7 illustrate the generation and addition of partial products and preload data, or the result of prior computations, in the carry save adder tree;

DESCRIPTION OF THE PREFERRED EMBODIMENTS

Figure 1:
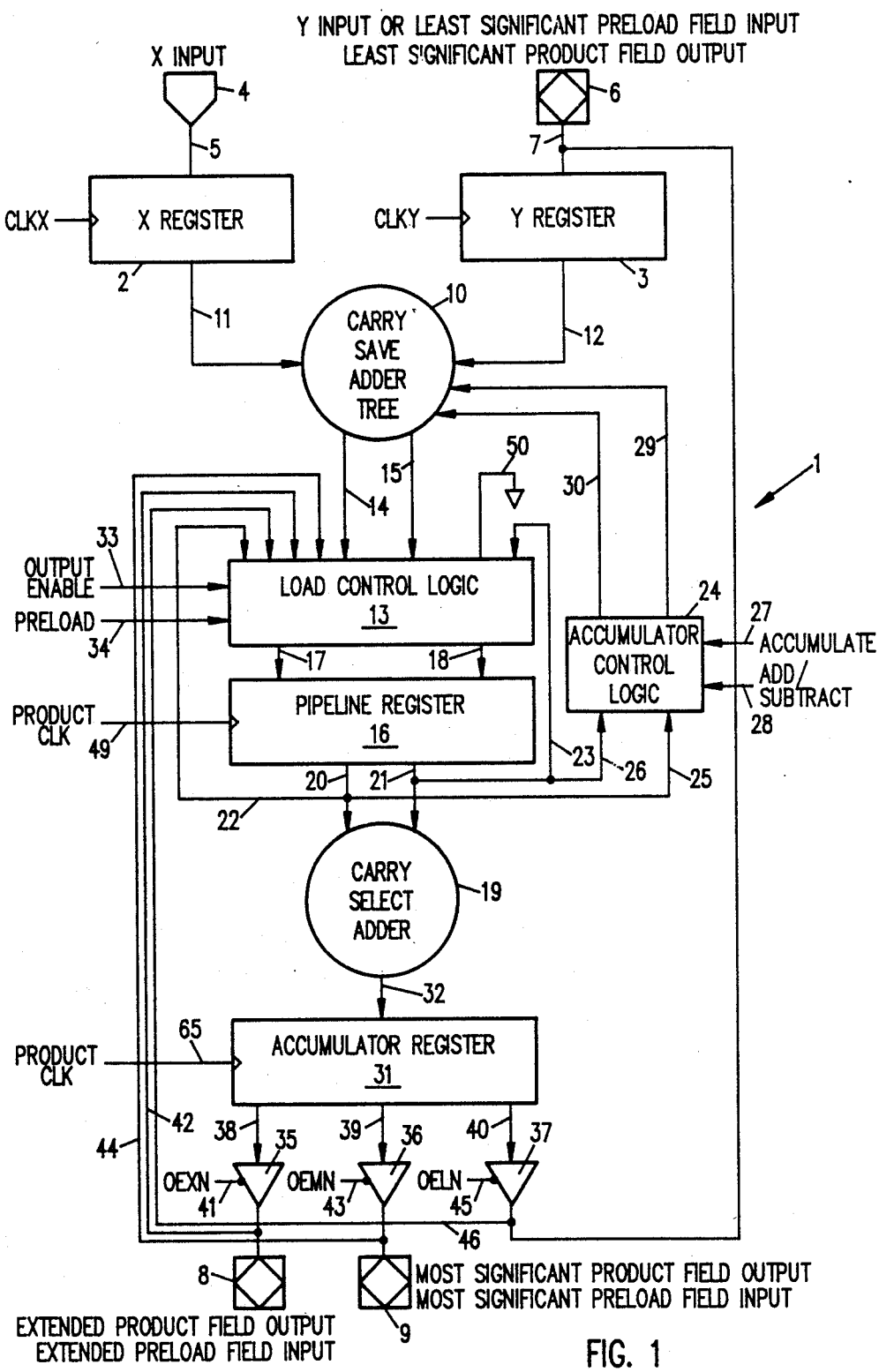
FIG. 1 is a block diagram of a first embodiment of the present invention.

The first embodiment of the present invention is illustrated in FIG. 1. Multiplier-accumulator circuit 1, which is illustrated in FIG. 1 in a simplified block diagram form, includes X register 2 and Y register 3 which receive input data to be multiplied to form an output product. X register 2 receives X input data from terminal 4 over line 5 and Y register 3 receives Y input data from bidirectional terminal 6 over line 7. As will be described more fully hereinafter, bidirectional terminal 6 is utilized to input data to multiplier-accumulator circuit 1, which input data may be the multiplier or multiplicand for a product to be produced, and may be used to input from a least significant preload field when multiplier-accumulator circuit 1 is utilized in a preload mode of operation. Bidirectional terminal 6 is also utilized as the output terminal for the least significant product field. In addition to bidirectional terminal 6, multiplier-accumulator circuit 1 also includes bidirectional terminals 8 and 9. Bidirectional terminal 8 provides the extended product field output for a product calculated by circuit 1 and is also used to input extended preload field data. In a similar fashion, bidirectional terminal 9 provides the most significant product field output and serves as the input terminal for preload data for the most significant preload field.

Figure 6:
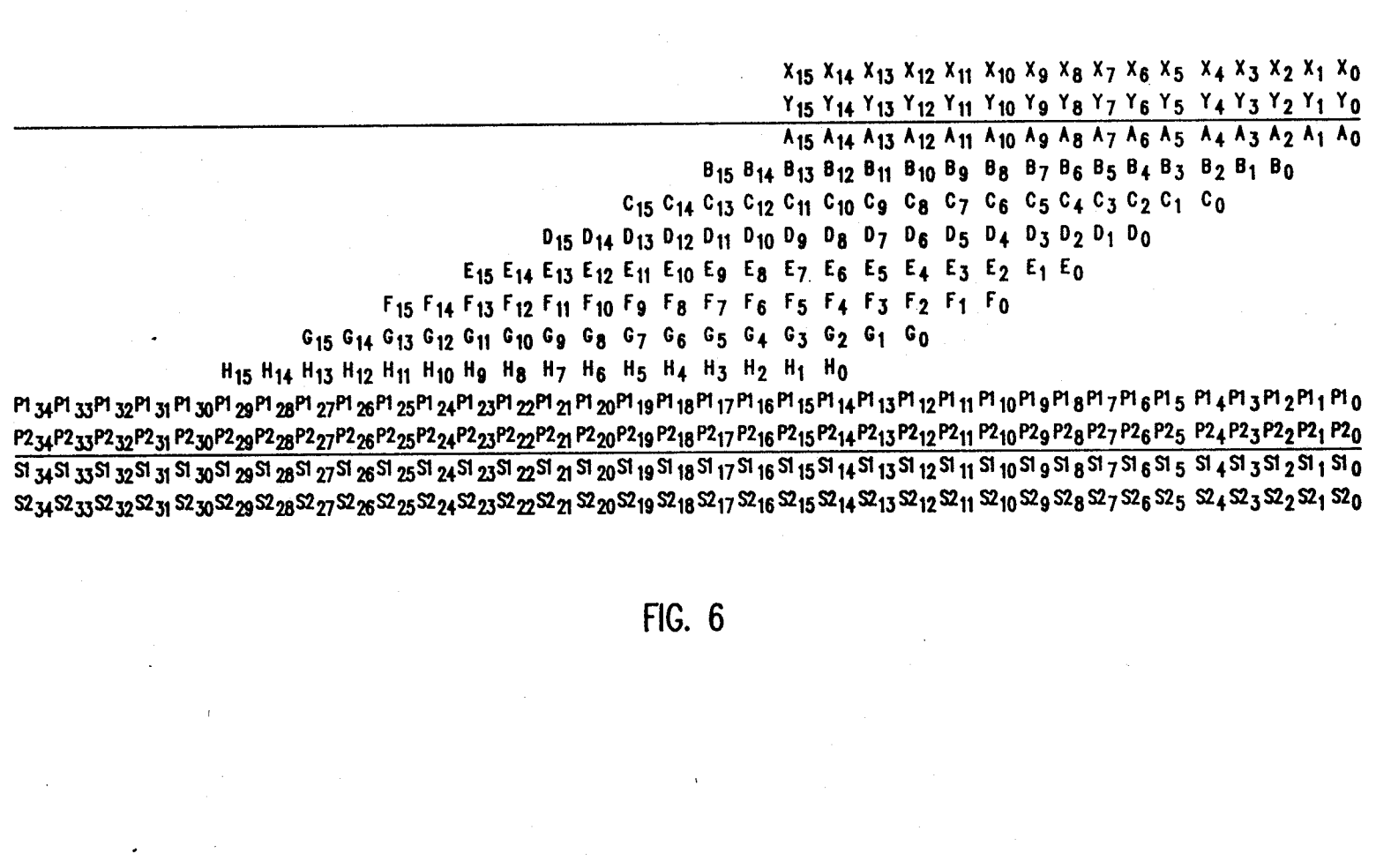

The present invention will be illustrated in a 16×16 bit format, that is the multiplier and multiplicand both including 16 bits, however, the invention may be practiced with multiplier and multiplicands having any number of bits. Upon the occurrence of a clock signal to X register 2, input data is latched into x register 2 and supplied to carry save adder tree 10 over line 11. Similarly, input data which is latched into Y register 3 upon the occurrence of the leading edge of a clock pulse to Y register 3 is transmitted to carry save adder tree 10 over line 12. Carry save adder tree 10 functions in a manner well known to those skilled in the art and produces a partial products field in performing the multiplication of binary data received from X register 2 and Y register 3. The partial products field for a 16 bit X input and 16 bit Y input is illustrated in FIG. 6, the partial products field consisting of terms $A_0$–$A_{15}$ through $H_0$–$H_{15}$. Carry save adder tree 10 utilizes the well known modified Booth encoding to create the eight partial products represented by A, B, C, D, E, F, G and H. Also illustrated in FIG. 6 are 35-bit words P1 and P2, which, as will be more fully explained hereinafter, are either preload data or words S1 and S2 from previous computations performed by carry save adder tree 10. For purposes of explanation, words S1 and S2 will be called sub-results. FIG. 6 will be utilized, and more fully explained, in the illustration of utilization of circuit 1 following the general explanation of the entirety of circuit 1.

Words S1 and S2 are supplied to load control logic circuit 13 over lines 14 and 15, respectively. As will be more fully described hereinafter, load control logic 13, based on external control signals, provides to pipeline register 16, over lines 17 and 18, data from carry save adder tree 10. If the preload feature of the invention is utilized to load pipeline register 16 with preload data over bidirectional terminals 6, 8 and/or 9, then some of the bits that would have come from carry save adder tree 10 will be replaced by the preload bits of data. In addition, load control logic circuit 13 may be conditioned by external control signals to pass words S1 and S2 to pipeline register 16, where words S1 and S2 represent the result of a previous sub-results produced by carry save adder tree 10. This will be more fully explained hereinafter in an explanation of the circuit operation.

Data from pipeline register 16 is passed to carry select adder 19 via lines 20 and 21. In addition, words S1 and S2 are fed back to load control logic circuit 13 over lines 22 and 23, respectively, and are transmitted to accumulator control logic circuit 24 over lines 25 and 26, respectively.

Accumulator control logic circuit 24, responsive to accumulate control signals supplied on line 27 and add-/subtract control signal supplied on line 28, will provide either positive or negative accumulation of data received on lines 25 and 26 or provide no accumulation. When positive accumulation occurs, data received from pipeline register 16 over lines 25 and 26 are fed back, without alteration, to carry save adder tree 10 over lines 29 and 30. Feedback data over lines 29 and 30 comprise words P1 and P2 as illustrated in FIG. 6. The operation of accumulator control logic circuit 24 will be explained more fully hereinafter.

As mentioned earlier, data latched into pipeline register 16 is supplied to carry select adder 19 over lines 20 and 21, and in our example the pair of 35 bit words S1 and S2 supplied to carry select adder 19 are combined in carry select adder 19 to provide to accumulator register 31, over line 32, the result of the product of multiplication, which was accomplished by the summation of the partial product field and, if applicable, preload input data or previous sub-results provided to carry save adder tree 10 over lines 29 and 30. Although in FIG. 1 a carry select adder is utilized to combine the two 35 bit words received from pipeline register 16 to produce a result word of 35 bits, any binary adder may be utilized to practice the invention.

To permit preloading data into circuit 1, it is necessary to block data from being transmitted from accumulator register 31 to load control circuit 13 so that in a preload operation data provided to bidirectional terminals 6, 8 and/or 9 will be loaded into pipeline register 16 under the control of Output Enable and Preload signals provided to load control circuit 13 over lines 33 and 34, respectively.

In the present invention, the blocking of data from accumulator register 31 is performed by tri-state buffers 35, 36 and 37. When no preloading is to be performed to the extended preload field, extended product field output data provided to tri-state buffer 35 over line 38 flows through tri-state buffer 35 and appears at terminal 8. In a similar fashion, most significant product field data supplied to tri-state buffer 36 over line 39 appears at bidirectional terminal 9 and least significant product field output data supplied to tri-state buffer 37 over line 40 appears at bidirectional terminal 6.

To perform a preload of data into pipeline register 16, a high, or 1 control signal is provided to the applicable control line of the tri-state buffer connected to the field from accumulator register 31 which is to be blocked from passing data through the tri-state buffer connected to that field. For example, to perform a preload of data in the extended product field, under external control a 1, or high signal, is supplied to tri-state buffer 35 over line 41 which causes tri-state buffer 35 to assume a high impedance state and block data which it receives from accumulator register 31 over line 38 from passing through tri-state buffer 35. Accordingly, extended preload field input data passes through bidirectional terminal 8 and is transmitted to load control logic circuit 13 via line 42. As will be described more fully hereinafter, OE and PREL to control signals are applied to load control logic circuit 13 over lines 33 and 34, respectively, to accomplish preloading of data for any of the product fields. Similarly, preloading of data to pipeline register 16 for the most significant preload field is accomplished by raising control terminal OEMN high, which is the same as providing a 1, or high signal, to tri-state buffer 36 over line 43 so that most significant preload data presented to bidirectional terminal 9 will be transferred to load control logic circuit 13 over line 44 for loading into pipeline register 16. To preload data in the least significant preload field, the signal to control terminal OELN of tri-state buffer 37 is a 1, which is supplied to tri-state, buffer 37 over line 45, which permits least significant preload field data applied to bidirectional terminal 6 to be loaded via line 46 and load control logic circuit 13 into pipeline register 16. Preloading of circuit 1 may be performed in a manner such that any or all of the preload fields may be enabled to load extended, most significant or least significant data.

Figures 2, 3:
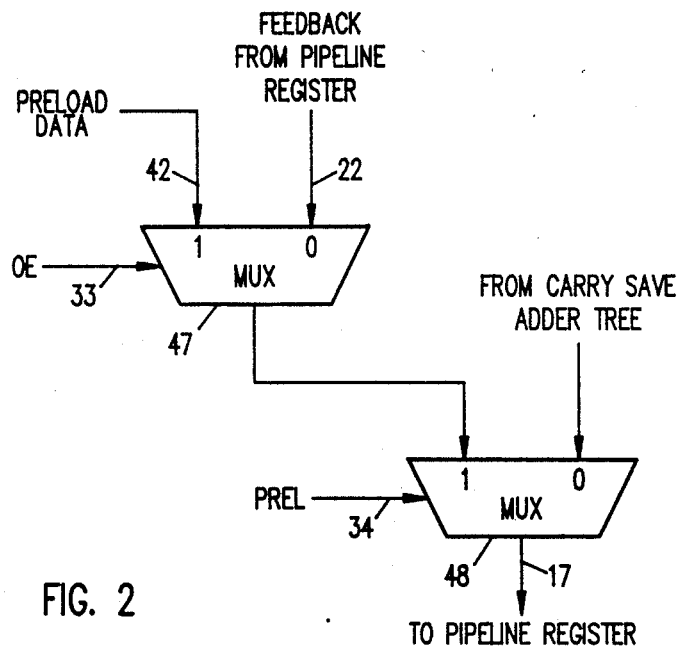
FIG. 2 is a block diagram illustrating the loadcontrol logic for the first embodiment.
FIG. 3 is the truth table for the logic circuit of FIG. 2.

FIG. 2 is a simplified block diagram of the control utilized in load control logic circuit 13 for directing data to pipeline register 16 With the present circuit operating in the mode of providing a 16×16 multiplier, the resulting product appearing on lines 38, 39 and 40 from accumulator register 31 consist of 35 bits. Of the 35 bits, 3 are provided for extended product field, and 16 each for the most significant product field and the least significant product field. Thus, when preloading data into pipeline register 16, control is required for each bit in each field and appropriate control signals are applied not only to tristate buffers 35, 36 and 37, but also to load control logic circuit 13 over lines 33 and 34 to provide output enable (OE) and preload (PREL) control signals, respectively. Pipeline register 16 includes 70 one-bit word locations, of which a maximum of 35 may be preloaded from bidirectional terminals 6, 8 and 9. Load control logic circuit 13 includes control logic as illustrated in FIG. 2 for each of the 70 locations, 35 each for lines 17 and 18. To illustrate the operation of a preload, attention is directed to FIGS. 2 and 3. FIG. 2 represents a simplified block diagram illustrating how preload data is directed by load control logic 13 to pipeline register 16. If no preload data is to be transferred to pipeline register 16, then control signals OE and PREL as illustrated in FIG. 3 are applied to logic within load control logic circuit 13.

Preloading of a bit in the extended product field will be described However, the process for preloading bits in any other field is accomplished in the same manner, hence description of one is applicable to the remaining fields. Referring to FIG. 2, preloading of a bit in the extended product field is accomplished by providing a 1, or high control signal, on OE via control line 33 to MUX 47 and providing a 1, or high control signal, on PREL over line 34 to MUX 48, and of course a high control signal is applied over line 41 to tri-state buffer 35. With conditions so set, upon the occurrence of product clock signal over line 49 to pipeline register 16, preload data applied to terminal 8 is loaded and latched into pipeline register 16. It will of course be appreciated by reference to FIG. 2 that each bit of the 70 bits which are presentable to pipeline register 16 can be, under the control of load control logic circuit 13, either from preload data, feedback from pipeline register 16, or may be transmitted from carry save adder tree 10 to pipeline register 16. How this will be accomplished will be more fully appreciated by reference to FIG. 3 which presents in truth table form the action for each bit control circuit within load control logic 13. For example, if the particular bit to be transferred to pipeline register 16 is from either preload data or feedback from pipeline register 16, then the control signal PREL on line 34 to MUX 48 would be a 1. Then depending on whether preload data or feedback from the pipeline register is required, OE signal will be a 1, or 0, respectively, applied over control line 31 to MUX 47. The other combinations are readily apparent from FIG. 3 and it will be appreciated that data provided to pipeline register 16 may, under the control of load control logic 13, come from either preload data, feedback data from pipeline register 16 or data from carry save adder tree 10.

When a preload operation is being performed, load control logic circuit 13 applies 35 bits of 0's to pipeline register 16 over line 18 to clear from pipeline register 16 any data which may be residual from previous operations. The 0's are provided by ground connection over line 50. Thus when data is latched into pipeline register 16 in a preload operational mode, the preload data for preloaded fields, and the original pipeline register data for nonpreloaded fields in the 35 bit word latched into pipeline register 16 on line 17 is transferred over lines 20 and 25 to accumulator control logic 24. For the preload operation, 35 bits of 0 are transferred to accumulator control logic circuit 24 over lines 21 and 26. In this manner, when carry save adder tree 10 adds the 35 bit word of preload data and the 35 bits of 0, the result yields only the preload data which is the desired value to be combined with the partial products field resulting from input to X register 2 and the Y register 3. By supplying preload data to carry save adder tree 10 to be combined with the product of subsequent data, this significantly reduces the time required for computation since it is not necessary for preload data to pass through carry select 19 and be latched into accumulator register 31 before the product computation of the data from X input and Y input is combined with preload data to yield the result of the multiplication of X and Y data and addition of that to the preload data.

Figures 4, 5:
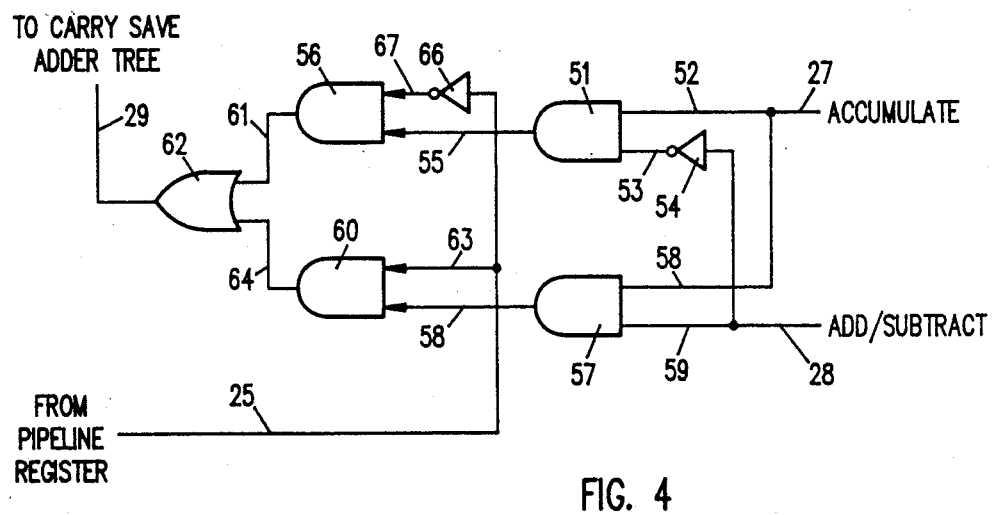
FIG. 4 illustrates the logic circuit utilized in the accumulator control logic of the invention in accordance with the first and second embodiments.
FIG. 5 illustrates the truth table for the logic circuit of FIG. 4.

Accumulator control logic circuit 24, under control of the ACCUMULATE and ADD/SUBTRACT signals on lines 27 and 28, respectively, control the data fed back to carry save adder tree 10 over lines 29 and 30. Data provided to accumulator control logic circuit 24 on lines 25 and 26, in the present example, 70 bits (35 bits on line 25 and 35 bits on line 26), are controlled on a bit-by-bit basis by circuitry within accumulator control logic circuit 24. A simplified logic diagram of the control of one bit received by accumulator control logic circuit 24 is illustrated in FIG. 4. Since the control is required on a bit-by-bit basis, there is one circuit of the type illustrated in FIG. 4 for each bit coming into accumulator control logic circuit 24. For purposes of explanation, the reference characters in FIG. 4 for one bit will be shown to assume that the bit being controlled is in the preload field and that the preload function is being performed. The options available based on the accumulation and add/subtract signals are that either data presented to accumulator control logic circuit 24 will be accumulated, that is fed back to carry save adder tree 10, or will not be accumulated. If accumulation is to occur, the accumulation may be either positive or negative to accomplish addition or subtraction. By reference to FIG. 4 and FIG. 5, which is a truth table for the circuit of FIG. 4, the operation of the circuit of FIG. 4 will be explained in connection with the assumptions that preload data is to be accumulated in carry save adder tree 10 and the accumulation is desired as an addition to data to be provided to carry save adder tree 10 as a result to multiplication of X and Y input. To set up this result, a high, or 1 signal, on ACCUMULATE input line 27 will be established and a high, or 1 signal, on the ADD/SUBTRACT control line 28 will be provided With this control input, the 1 on lines 58 and 59 of AND gate 57 will result in a 1 output on line 58, which is one of the inputs to AND gate 60. With respect to AND gate 51, although there is a 1 appearing on line 52 to AND gate 51, the 1 on line 28 will be inverted by inverter 54 providing a 0 on input line 53 to AND gate 51, resulting in a 0 on output line 55 of AND gate 51. Thus AND gate 56 (seeing a 0 on line 55), will output a 0 on line 61 which is connected to one of the inputs to OR gate 62. Taking as a given that a signal on the particular bit in question from line 25 of pipeline register 16 is a 1, this 1 on line 63 will result in a 1 on line 64 (the output of AND gate 60). This results in enabling OR gate 62 which provides a 1 output to carry save adder tree from OR gate 62 over line 29. It will be appreciated that if the signal on line 25 from pipeline register 16 had been a 0, then the output from AND gate 60 would be a 0, and since the output from AND gate 56 is also a 0, a 0 would be output from OR gate 62 resulting in the desired action, that is passing the data from pipeline register 16 to the carry save adder tree 10 unchanged. By following a similar analysis, it will be appreciated that if the input signals to accumulator control logic circuit 24 on ACCUMULATE line 27 is a 1 and on the ADD/SUBTRACT input line 28 is a 0, inverted data will be passed from pipeline register 16 to carry save adder tree 10. If no accumulation is desired, then a 0 on ACCUMULATE control line 27 will result in all 0's being transmitted to carry save adder tree 10 from the accumulate control logic circuit 24.

As is well known to those skilled in the art, the mode of subtracting a binary number from another binary number may be accomplished by adding the 1's complement, which is the result which is obtained with the logic circuit illustrated in FIG. 4 since the 1's complement of the bit received by accumulator control logic circuit 24 will be passed to carry save adder tree 10 when the ACCUMULATE control line 27 is high and the ADD/SUBTRACT control line 28 is low. With those control signals provided to ACCUMULATE control line 27 and ADD/SUBTRACT control line 28, a 0 will be provided to AND gate 60 on line 58 and a 1 will be provided to AND gate 56 on line 55. To illustrate how the 1's complement is provided, assume that a 1 is provided on line 25, which should result in a 0 out on line 29. With a 1 input from line 25, a 0 will result on output line 64 of AND gate 60. Inverter 66 will provide a 0 to AND gate 56 over line 67, resulting in a 0 on line 61, which will result in a 0 on line 29 (the desired result) since both inputs to OR gate 62 are 0s. It will of course be appreciated that a 0 on line 25 will result in a 1 on line 29.

For a series of computations not including a preload field, accumulator control logic circuit 24 functions in the same manner, and under the control of signals on ACCUMULATE and ADD/SUBTRACT control lines, 27 and 28 respectively, provides for either the addition or the subtraction of data from a previous computation to data which will be derived by a subsequent computation from the input of the X and Y terminals 4 and 6, respectively.

As an example of operation, we'll start with circuit 1 having no previous data from calculations in circuit 1 and illustrate how the calculation of $Z_1 = X \times Y$ is performed, where X is 16 bit word $X_0-X_{15}$, and Y is 16 bit word $Y_0-Y_{15}$. The X word is loaded into X register 2 and the Y word into Y register 3. Upon receipt by X and Y registers of a clock signal, the X and Y words are input to carry save adder tree 10 which provides a partial products field which is generated by multiplication, using a modified Booth encoding algorithm to yield partial products $A_0-A_{15}$, $B_0-B_{15}$, to $H_0-H_{15}$ illustrated in FIG. 6. The modified Booth's algorithm is well known to those skilled in art and is advantageously used to reduce the number of partial products by one half. Various texts have described the modified Booth encoding algorithm, one in particular being a book entitled *"Introduction To Arithmetic For Digital Systems Designers"* by Schlomo Waser and Michael J. Flynn, Copyright ®1982 CBS College Publishing, 383 Madison Avenue, New York, NY 10017. The modified Booth's algorithm is described on pages 133-135 of the foregoing book, and such description is hereby incorporated by reference. With no preload data and no previous results of calculation, words $P1_0-P1_{34}$ and $P2_0-P2_{34}$ are all "0s", giving sub-result words $S1_0-S1_{34}$ and $S2_0-S2_{34}$ which pass through load control logic circuit 13 and become latched into pipeline register 16 upon receipt of a product clock pulse over line 49. If this is the product desired, i.e. no further calculations are to be performed, words S1 and S2 received by carry select adder 19 are added to yield the result of the sum of words S1 and S2, which result will be latched into accumulator register 31 by the line 65. The resulting product is available at bidirectional terminals 6, 8 and 9. During this sequence, signals on control terminals of tri-state buffers 35, 36 and 37 would be held low (0) (to keep tri-state buffers 35, 36 and 37 in low impedance state to permit output of data from accumulator resister 31 to reach bidirectional terminals 6, 8 and 9); control signals to PREL and OE lines to respective MUXes in load control logic circuit 13 would be "0"; and the signal on ACCUMULATE line 27 to accumulator control logic 24 would be a 0 since no preload data or prior result of computations is desired to be fed back to carry save adder tree 10.

Figure 7:
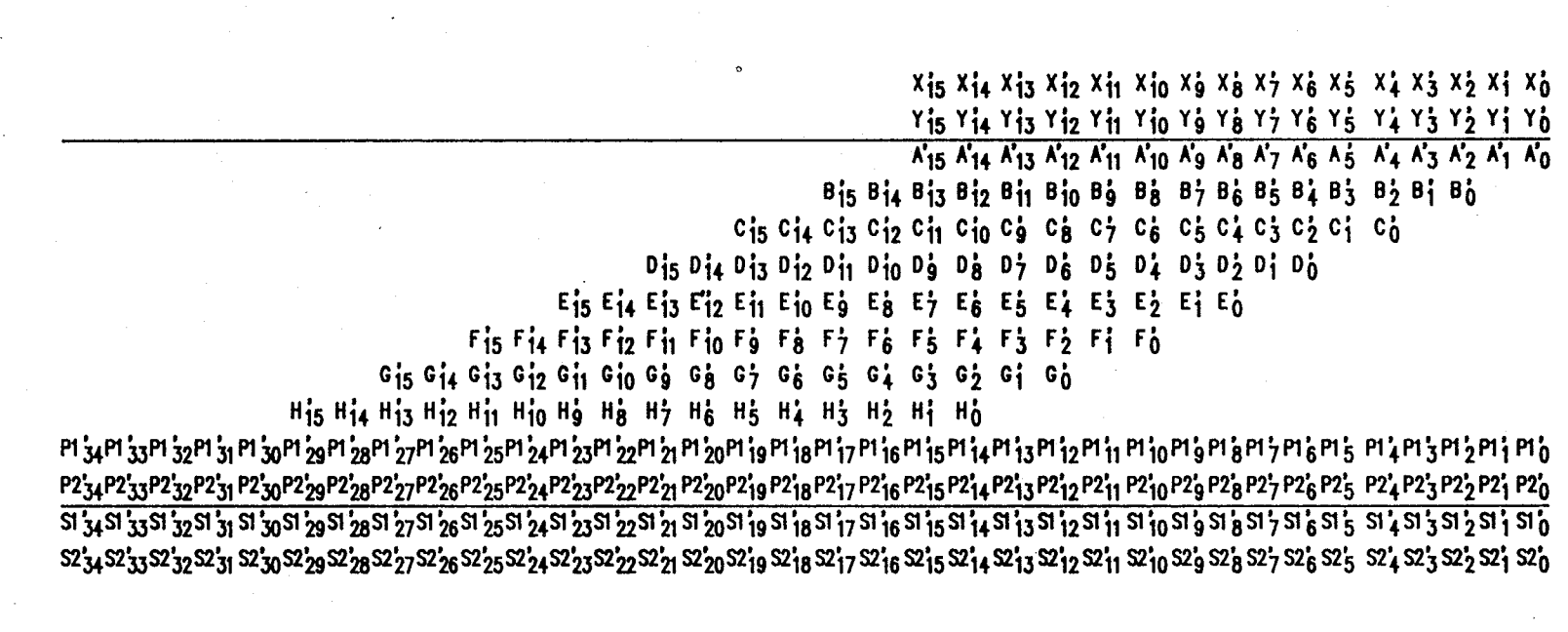

If it is desired to compute $Z_2 = X \times Y + X' \times Y'$, the computation would be performed in two steps. First, $Z_1 = X \times Y$ would be computed as set forth above. Then product of $X' \times Y'$ would be computed and added to product of $X \times Y$, yielding $S1'_0-S1'_{34}$ and $S2'_0-S2'_{34}$, which when added in carry select adder 19 would produce $Z_2$. Attention is directed to FIG. 7 as an aid to understanding how $Z_2$ is obtained by circuit 1. To more fully explain how $Z_2$ is obtained, start with words S1 and S2 (the result of $X \times Y$ above) latched in pipeline register 16. The X' and Y' words are input to X register 2 and Y register 3, respectively. The signals on PREL line 34 and OE line 33 to load control logic circuit 13 are set as in the first example above since no preload data will be involved in the computation. The control signals to accumulator control logic 24 will, however, be set to positively accumulate words S1 and S2, thus S1 and S2 are fed back to carry save adder tree 10 over lines 29 and 30 to provide the words we'll call $P1'_0-P1'_{34}$ and $P2'_0-P2'_{34}$.

The field of partial products of $X'_0-X'_{15} \times Y'_0-Y'_{15}$ ($A'_0-A'_{15}$ through $H'_0-H'_{15}$) will be added to $P1'_0-P1'_{34}$ and $P2'_0-P2'_{34}$ to produce a new sub-result of two words, $S1'_0-S1'_{34}$ and $S2'_0-S2'_{34}$. However, prior to clocking the X and Y registers, accumulator control logic control signals ACCUMULATE and ADD/SUBTRACT must be set to perform positive accumulation of data coming out of pipeline register 16, in this example S1 and S2, with partial products of $X' \times Y'$. The control signals to accomplish positive accumulation are a "1" (or high) to ACCUMULATE control line 27 and a "1" (or high) on the ADD/SUBTRACT control line 28. With these conditions set, X and Y registers are clocked, X' and Y' are multiplied in carry save adder tree 10, producing the partial products field $A'_0-A'_{15}$ through $H'_0-H'_{15}$ which is illustrated in FIG. 7; clocking of product clock occurs at the same time, making S1 and S2 appear at the output of pipeline register 16, and S1 and S2 appear to carry save adder tree 10 through accumulator control logic 24, where S1 and S2 are added to partial products of $X' \times Y'$, yielding new sub-result words $S1'_0-S1'_{34}$ and $S2'_0-S2'_{34}$ which are latched into pipeline register 16. This will be more readily apparent by reference to FIG. 7. In studying FIG. 7, it should be recalled that words S1 and S2 (which were the sub-result words of $X \times Y$) which were fed back to carry save adder tree 10 under the control of accumulator control logic circuit 24 were renamed $P1'_0-P1'_3$ and $P2'_0-P2'_{34}$ (which is illustrated in FIG. 7). Thus pipeline register 16 now contains words $S1'_0-S1'_{34}$ and $S2'_0-S2'_{34}$, which represent $Z_2$. Sub-result words $S1'_0-S1'_{34}$ and $S2'_0-S2'_{34}$ are added by carry select adder 19 to yield $Z_2$ which will be latched into accumulator register 31 on the occurrence of the next product clock, and which then becomes available on bidirectional terminals 6, 8 and 9.

If in the immediately preceding example, it had been desired to subtract the first result from the second [that is compute $Z_2 = (X' \times Y') \times (X \times Y)$], then the control signals to accumulator control logic circuit 24 would have been set at "1" to ACCUMULATE control logic 27 and a "0" on ADD/SUBTRACT line 28. This would result in passing inverted data (words S1 and S2 would be inverted on a bit for bit basis) from accumulator control logic circuit 24 to carry save adder tree 10 and the summation in carry save adder tree 10 would yield sub-result words $S1''_0-S1''34$ and $S2''_0-S2''_0$ (not shown) which represent $Z_2 = (X' \times Y') - (X \times Y)$.

If in computations it is desirable to utilize preload data, that data would be loaded into circuit 1 by using the preload process described previously, which, as it will be recalled, loads preload data into pipeline register 16, for transfer to carry save adder tree 10 through accumulator control logic circuit 24. This preload data may be added to, or subtracted from (based on the signals to control lines ACCUMULATE and ADD/SUBTRACT) the calculations being performed by carry save adder tree 10 on the data received from X register 2 and Y register 3.

Figure 8:
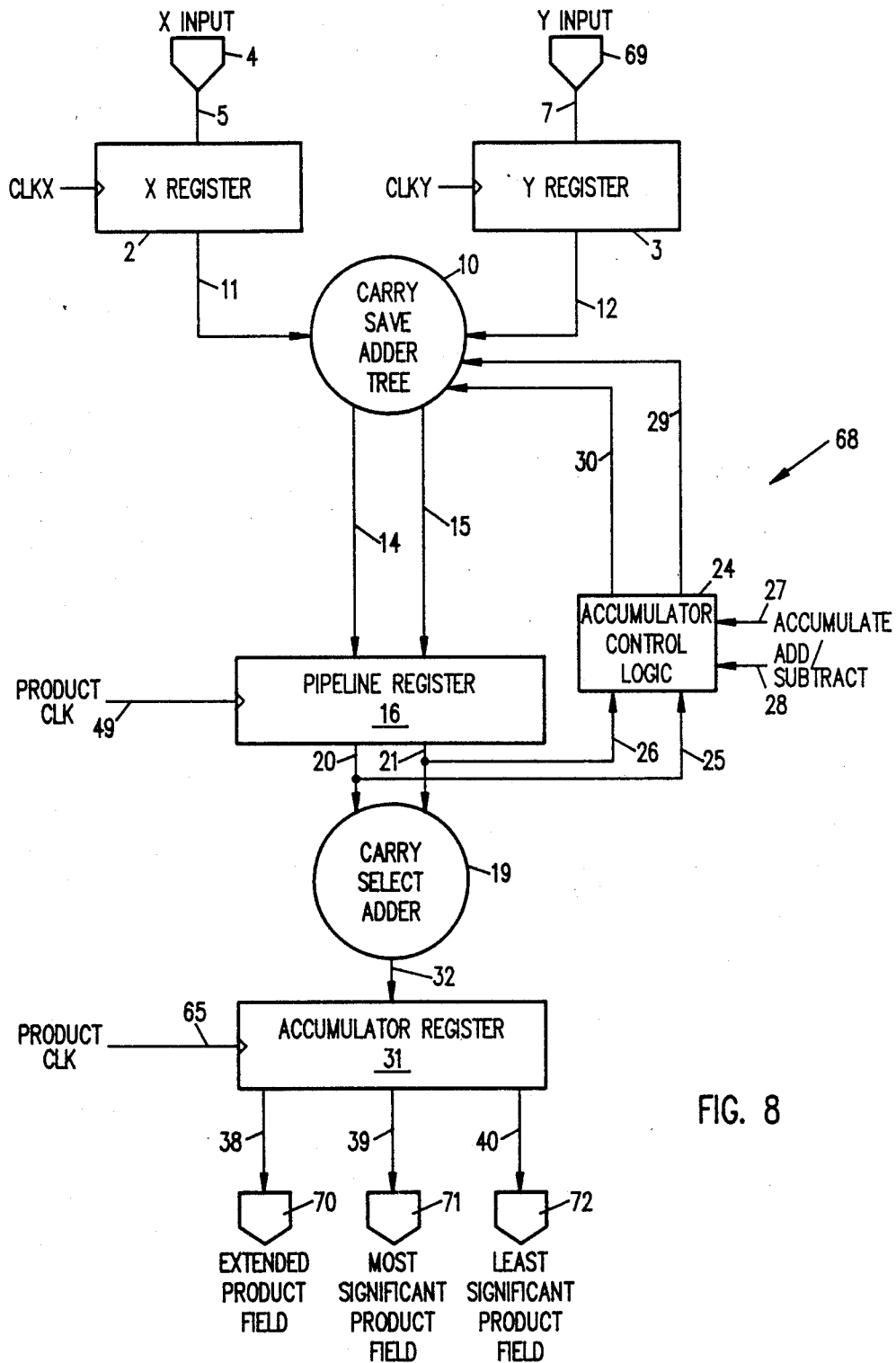
FIG. 8 illustrates a second embodiment of the present invention.

It will of course be appreciated by those skilled in the art that the invention is not limited to a multiplier-accumulator having a preload capability, but is advantageous and unique over the prior art with respect to merely the multiplier-accumulator capability of the circuit. A second embodiment of the present invention is illustrated in FIG. 8 wherein multiplier-accumulator circuit 68 is shown in block diagram form. Portions of multiplier-accumulator circuit 68 which are common to those in multiplier-accumulator circuit 1 are indicated by like reference characters. Multiplier-accumulator circuit 68 provides the exemplary characteristics of multiplier-accumulator circuit 1, however, multiplier-accumulator circuit 68 is used for fast multiplication and accumulation where preload data is not required to be included in the calculations performed. Referring to FIG. 8, it will be noted that multiplier-accumulator circuit 68 is simplified with respect to multiplier-accumulator circuit 1 since it is not necessary to include tri-state buffers or load control logic. Also, since preloading is not required, bidirectional terminals are unnecessary. Multiplier-accumulator circuit 68 includes X input terminal 4, Y input terminal 69. The result of computations by multiplier-accumulator circuit 68 are made available over lines 38, 39 and 40 from accumulator register 31 to provide the extended product field, most significant product, and least significant product field to output terminal 70, 71 and 72, respectively. Since the typical use of a multiplier-accumulator circuit 20 is to accumulate the result of a series of computations, accumulator control logic circuit 24 is used to feed back the output words from pipeline register 16 to carry save adder tree 10 over lines 29 and 30. Hence the accumulation may be positive (to add) or negative (to subtract) and ACCUMULATE signal on line 27 as well as ADD/SUBTRACT signal on line 28 are also required. It will of course be appreciated that the logic circuitry within accumulator control logic circuit 24, as well as the control signals ACCUMULATE and ADD/SUBTRACT, for multiplier-accumulator circuit 68 may be the same as those used for multiplier-accumulator circuit 1 (illustrated in FIG. 1).

Figure 9:
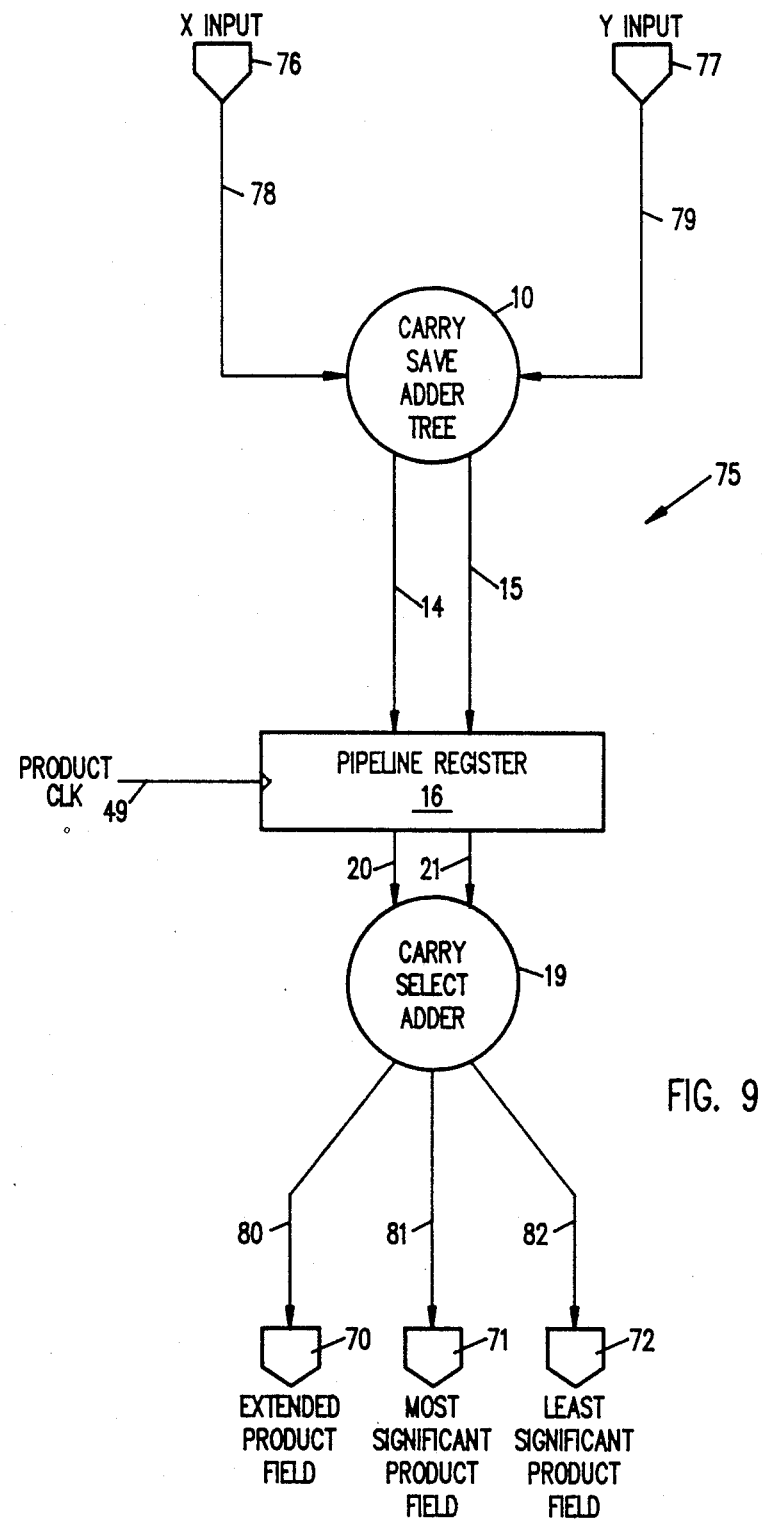
FIG. 9 illustrates a third embodiment at the present invention.

A third embodiment of the present invention, a digital multiplier circuit is illustrated in FIG. 9. Digital multiplier circuit 75 includes X input terminal 76 and Y input terminal 77 for receiving multiplier and multiplicand digital information to be multiplied and yield a product. As will become apparent by reference to the preceding figures, certain portions of digital multiplier circuit 75 are the same as those utilized in preceding embodiments and accordingly contain like numbered reference characters. Input data received on X input terminal 76 is supplied to carry save adder tree 10 over line 78 and Y input data received on Y input terminal 77 is supplied to carry save adder tree 10 over line 79. Carry save adder tree 10 operates in the manner as set forth previously and produces a partial products field based on input data to X input terminal 76 and Y input terminal 77 to produce sub-results which are provided to pipeline register 16 over lines 14 and 15. As will be recalled from the prior explanation of the operation of digital multiplier-accumulator circuit 1, carry save adder tree 10 includes circuitry to perform the modified Booth's encoding and, assuming the X input data and Y input data are words each of 16 bits, produces the partial products field consisting of $A_0$–$A_{15}$ through $H_0$–$H_{15}$. Partial products field is added to produce sub-result words $S1_0$–$S1_{34}$ and $S2_0$–$S2_{34}$. Sub-result words S1 and S2 are latched into pipeline register 16 upon the occurrence of the leading edge of a product clock pulse to pipeline register 16 over line 49. Sub-result words S1 and S2 flow to carry select adder 19 over lines 20 and 21. Carry select adder 19 adds sub-result word S1 and S2 and produces the resulting product consisting of a 35 bit word, 3 bits of which are extended product field data, which is provided to output terminal 70 over line 80, sixteen bits of most significant product field data, which is supplied to output terminal 71 over line 81 and 16 least significant product field bits, which are supplied to output terminal 72 over line 82.

The foregoing illustrates three embodiments of the present invention, however, various modifications and deviations from the embodiments disclosed may be made by those skilled in the art without departing from the spirit and scope of the invention. It is of course also understood that the invention is not limited by the foregoing description and is defined by the following claims.

We claim:

1. A digital multiplier-accumulator circuit comprising:

first and second input registers, each having an input and an output;

a carry save adder tree circuit having a first input circuit connected to the output of said first and second input registers, a second input circuit, and an output circuit;

a pipeline register having an input circuit and an output circuit;

first circuit means having a first input connected to the output circuit of said carry save adder tree and an output connected to the input circuit of said pipeline register;

second circuit means connecting the output circuit of said pipeline register to the second input circuit of said carry save adder tree;

a second adder circuit having an input circuit and an output circuit;

means connecting the output circuit of said pipeline register to the input circuit of said second adder circuit;

an accumulator register having an input circuit and an output circuit;

means connecting the output circuit of said second adder circuit to the input circuit of said accumulator register;

data output terminals for providing output data from said accumulator register; and means connecting the output circuit of said accumulator register to said data output terminals.

2. The circuit of claim 1, wherein said second adder circuit comprises a carry select adder.

3. The circuit of claim 1, wherein said means connecting the output of said accumulator register to said data output terminals includes means for preventing signals from said accumulator register output circuit from reaching said data output terminals, and wherein said first circuit means includes a second input, and wherein said circuit of claim 1 further includes means connecting said data output terminals to said second input of said first circuit means whereby data may be loaded into said pipeline register from said data output terminals.

4. The circuit of any of claims 1–3, wherein said carry save adder tree includes data encoding means.

5. The circuit of claim 4, wherein said data encoding means encodes data according to the modified Booth's encoding algorithm.

6. A digital multiplier-accumulator circuit comprising:

first and second input registers, each having an input and an output;

a carry save adder tree circuit having a first input circuit connected to the output of said first and second input registers, and having a second input circuit, and an output circuit;

a pipeline register having an input and an output;

means connecting the input of said pipeline register to the output circuit of said carry save adder tree;

accumulator control logic means having an input connected to the output of said pipeline register, and having an output connected to said second input circuit of said carry save adder tree;

a second adder circuit having an input connected to the output of said pipeline register, and having an output;

an accumulator register having an input connected to the output of said second adder circuit, and having an output for providing output data.

7. The circuit of claim 6, wherein said second adder circuit comprises a carry select adder.

8. The circuit of claim 6 or 7, wherein said carry save adder tree includes data encoding means.

9. The circuit of claim 8, wherein said data encoding means encodes data according to the modified Booth's encoding algorithm.

* * * * *